(12) United States Patent
Okada et al.

(10) Patent No.: US 7,691,193 B2
(45) Date of Patent: Apr. 6, 2010

(54) WATER-BASED PIGMENT DISPERSION FOR INK-JET RECORDING, INK COMPOSITION FOR INK-JET RECORDING AND METHOD OF PRODUCING THE SAME

(75) Inventors: Shinichi Okada, Kitaadachi-gun (JP); Kyouko Takashima, Kuki (JP); Ryouta Hibino, Saitama (JP)

(73) Assignee: Dainippon Ink & Chemicals, Inc., Tokyo (JP)

( * ) Notice: Subject to any disclaimer, the term of this patent is extended or adjusted under 35 U.S.C. 154(b) by 766 days.

(21) Appl. No.: 10/553,598

(22) PCT Filed: Jul. 29, 2004

(86) PCT No.: PCT/JP2004/011195
§ 371 (c)(1), (2), (4) Date: Oct. 18, 2005

(87) PCT Pub. No.: WO2005/012443
PCT Pub. Date: Feb. 10, 2005

(65) Prior Publication Data
US 2006/0235106 A1    Oct. 19, 2006

(30) Foreign Application Priority Data
Jul. 31, 2003    (JP) .............................. 2003-204620

(51) Int. Cl.
*C09D 11/10* (2006.01)
(52) U.S. Cl. ...................... 106/31.77; 523/160; 524/87; 524/90; 524/92; 524/102
(58) Field of Classification Search .................. 523/160
See application file for complete search history.

(56) References Cited

U.S. PATENT DOCUMENTS 5,618,343 A * 4/1997 Hendi et al. ................. 106/498
6,258,503 B1 * 7/2001 Nakamura et al. ..... 430/137.18
7,008,994 B1 * 3/2006 Waki .......................... 524/556
2004/0009294 A1 * 1/2004 Kuribayashi et al. ........ 427/212

FOREIGN PATENT DOCUMENTS

| EP | 790281 B1 * | 12/2001 |
|---|---|---|
| JP | 6-157954 | 6/1994 |
| JP | 9-151342 | 6/1997 |
| JP | 10-60332 | 3/1998 |
| JP | 10-88042 | 4/1998 |
| JP | 2000-80299 | 3/2000 |
| JP | 2000-191974 | 7/2000 |
| JP | 2001-81390 | 3/2001 |
| JP | 2002-241638 | 8/2002 |
| JP | 2002-256201 | 9/2002 |
| JP | 2004-26927 | 1/2004 |
| JP | 2004-43791 | 2/2004 |
| JP | 2004-91590 | 3/2004 |

OTHER PUBLICATIONS

Machine English Translation of JP 2004/091590 A.*
Machine translation of JP 2000-191974 A.*

* cited by examiner

*Primary Examiner*—David Wu
*Assistant Examiner*—Vu Nguyuen
(74) *Attorney, Agent, or Firm*—Edwards Angell Palmer & Dodge LLP

(57) ABSTRACT

Disclosed are an aqueous pigment dispersion for inkjet ink, a method for producing the same, and an ink composition for inkjet recording which mainly contains the aqueous pigment dispersion for inkjet ink. The method for producing the aqueous pigment dispersion for inkjet ink is characterized by comprising a kneading step wherein a mixture including a styrene resin, a quinacridone pigment, a phthalimidomethylated quinacridone compound, an alkali metal hydroxide and a wetting agent iskneaded for producing a solid colored kneaded material, and a dispersing step wherein the thus-obtained solid colored kneaded material is dispersed into an aqueous medium.

12 Claims, No Drawings

WATER-BASED PIGMENT DISPERSION FOR INK-JET RECORDING, INK COMPOSITION FOR INK-JET RECORDING AND METHOD OF PRODUCING THE SAME

TECHNICAL FIELD

The present invention relates to a method of producing a water-based pigment dispersion for red or magenta ink-jet ink and an ink composition for ink-jet recording, and to a water-based pigment dispersion for ink-jet ink and an ink composition for ink-jet recording produced by the method.

BACKGROUND ART

As a water-based ink for ink-jet recording, The pigmented ink has been developed. The pigmented ink is expected to have excellent water resistance and light fastness, but has problems such as change over time due to aggregation or sedimentation of the pigment, and clogging of a nozzle of print head. To solve these problems, a method of dispersing a pigment in an aqueous medium using a resin as a dispersant is employed. As this method, there has been proposed a method of dispersing a resin which has an acid value in water in the presence of a basic component to obtain an aqueous solution, adding a pigment, sufficiently stirring the mixture, and dispersing the pigment using a paint shaker or a sand mill (see Patent Document 1). However, since this method does not include the process of producing a colored kneaded mixture by a kneading prior to dispersing process, long dispersing process time is required, causing a problem such as low production efficiency. The resin used as a dispersant is not selected enough in this method. Since the water-based pigment dispersion thus obtained is insufficient in dispersion stability, it is difficult to stably disperse the pigment for a long period of time by using only the resin as the dispersant. Furthermore, it is impossible to realize good ejection properties of the ink, and good image quality and durability of printed images. Thus, a water-based pigmented ink composition for ink-jet recording having excellent long-term storage stability has never been provided.

As for resin used as dispersant, a styrene-based resin has been studied. For example, there is known an example of a water-based pigment dispersion for ink-jet ink in which a mixture of a humectant, sodium hydroxide and carbon black is dispersed by using styrene-acrylic resin (styrene/acrylic acid/methacrylic acid=77/10/30, molecular mass: 7200 and 8300) as the dispersant with a paint shaker (see Patent Document 2). According to the method of producing a water-based pigment dispersion described in the above publication, it is made possible to produce a water-based ink for ink-jet recording having excellent dispersion stability in which carbon black has a fine particle size, and the water-based ink is excellent in ink ejection properties. However, since the kneading process for producing a colored kneaded mixture is not included and an effective auxiliary dispersant is not used, the water-based ink was insufficient in long-term dispersion stability when used for a thermal jet type ink-jet printer. When this method is applied to an azo pigment or quinacridone pigment, which is considered to have poor dispersibility, good dispersibility is not attained as compared with carbon black.

Trials adding various pigment derivatives as auxiliary dispersants other than using the resin as the dispersant, were made so as to stably maintain a dispersion state of the pigment for a long period.

For example, there is proposed a method of utilizing electrostatic repulsion of a sulfonic acid group-containing pigment derivative adsorbed onto the surface of a pigment using a pigment and a sulfonic acid group-containing pigment derivative (see Patent Document 3). According to this method, although dispersion stability of a colorant is improved, printed matter obtained has high affinity with water because of the presence of a polar functional group on the surface of the colorant. Furthermore, according to this method, dispersion stability is improved only by the addition of the pigment derivative, and thus there may arise a problem of poor water resistance.

To attain excellent dispersibility and dispersion stability of a water-based pigment dispersion or recording ink, which contains a quinacridone-based pigment as the colorant, there are proposed an encapsulated pigment dispersion wherein a quinacridone-based pigment and a dimethylaminomethylated quinacridone compound are used in combination (see Patent Document 4), and a water-based pigment dispersion containing a quinacridone-based pigment, a phthalimidomethylated quinacridone-based compound, a quinacridone-sulfonic acid-based compound, and a anionic group-containing organic polymeric compound having a glass transition point of −20 to 60° C. (see Patent Document 5). However, the magenta water-based pigment dispersion described in these publications has never been studied regarding selection of the resin used as dispersant and the kneading method suited for the resin to be used, and thus it was not sufficient in dispersion level and dispersion stability.

It was difficult to produce a water-based pigment dispersion with good dispersibility, containing a quinacridone pigment having poor dispersibility, only by using the dispersant or auxiliary dispersant.

To improve dispersibility of the water-based pigment dispersion in the production process, a mixture of a resin and a pigment, or a mixture of an aqueous resin solution containing a resin, water, a water-soluble organic solvent, and a pigment is previously milled by rollers prior to the dispersing step. In the method of milling using twin rollers, there is employed a method of kneading the mixture to obtain solid chips containing a pigment, mainly adding water and a water-soluble organic solvent to the solid chips, and dispersing them using a high-speed mixer or homogenizer to obtain a water-based pigment dispersion (see, for example, Patent Documents 6 and 7).

To easily produce a resin solution, an organic amine compound is added during kneading and a specific pigment derivative is also used (see, for example, Patent Document 8).

A water-based pigment dispersion is produced by kneading a styrene-acrylic resin having a weight-average molecular weight of 50000 using twin rollers (see, for example, Patent Document 9).

By using the above method, the pigment is finely ground between rollers under shear, and coating with the resin as the dispersant proceeds on the surface of the finely ground pigment. To optimize kneading conditions of the mixture of the resin and the pigment, kneading is carried out after adding a solvent thereby to dissolve the resin, or melting the entire mixture. Therefore, in the case of preparing a water-based pigment dispersion from the kneaded mixture, removal of the solvent and crushing of the melted kneaded mixture are required and the dispersing time is prolonged, and thus a water-based pigment dispersion having good dispersion stability is not always obtained. For example, kneading using twin rollers is conducted in an open system and water and the water-soluble organic solvent are vaporized during kneading and, finally, solid chips having high solid content are obtained. In the dispersing step, crushing and dispersing of the pigment in the form of solid chips must be conducted after adding water and the water-soluble organic solvent. Since the pigment coated with the resin as the dispersant is crushed, the coating of the surface of the pigment may become insufficient.

Only by passing through the kneading step, the pigment in the water-based pigment dispersion is finely ground and initial dispersibility is improved. However, the water-based pigment dispersion is insufficient in long-term dispersion stability under a high-temperature environment on the assumption that it is used for a thermal jet type ink-jet printer.

To obtain a satisfactory aqueous dispersion of a quinacridone-based pigment having poor dispersibility, it is important to use a method capable of effectively realizing coating of the surface of the pigment with the resin and adsorption of the auxiliary dispersant onto the surface of the pigment by selecting the resin as the dispersant and an auxiliary dispersant.

However, there has never been found a method of producing an ink composition for ink-jet recording containing a quinacridone-based pigment, capable of simultaneously realizing dispersibility, long-term dispersion stability, and ink ejection properties during image printing at a high level. Thus, it has been strongly required to develop an ink composition for ink-jet recording which is used to satisfactorily perform thermal jet type ink-jet recording, and a method of producing a water-based pigment dispersion for ink-jet ink used to produce the above ink composition.

Patent Document 1: Japanese Patent Application, First Publication No. Hei 10-60332
Patent Document 2: Japanese Patent Application, First Publication No. 2002-256201
Patent Document 3: Japanese Patent Application, First Publication No. 2002-241638
Patent Document 4: Japanese Patent Application, First Publication No. Hei 9-151342
Patent Document 5: Japanese Patent Application, First Publication No. 2000-191974
Patent Document 6: Japanese Patent Application, First Publication No. Hei 6-157954
Patent Document 7: Japanese Patent Application, First Publication No. 2000-80299
Patent Document 8: Japanese Patent Application, First Publication No. 2001-81390
Patent Document 9: Japanese Patent Application, First Publication No. Hei 10-88042

An object of the present invention is to provide a red or magenta water-based ink composition for ink-jet recording, which is excellent in dispersibility and dispersion stability and is less likely to cause an increase in particle size even when allowed to stand at high temperature for a long period, and also which is less likely to cause an increase in viscosity and is excellent in printing stability, a water-based pigment dispersion for ink-jet ink used to produce the same, and a method of producing the same.

Another object of the present invention is to provide a water-based ink composition for an ink-jet recording suited for a thermal ink-jet recording system.

DISCLOSURE OF THE INVENTION

The present inventors have intensively researched about the above problems and found that these problems can be solved by using the following means.

Thus, the present invention provides a method of producing a water-based pigment dispersion for ink-jet ink, which includes a kneading process for kneading a mixture containing a styrene-based resin, a quinacridone-based pigment, a phthalimidomethylated quinacridone-based compound, an alkali metal hydroxide and a humectant to produce a colored kneaded solid mixture, and a dispersing process for dispersing the colored kneaded solid mixture in an aqueous medium, wherein the styrene-based resin has 60% by mass or more of a styrene-based monomer unit based on all monomer components, a monomer unit containing an unsaturated aliphatic carboxylic acid having a radical polymerizable double bond, an acid value of 50 to 300 and a weight-average molecular weight of 7500 to 40000.

According to the method of the present invention, since a mixture of a quinacridone-based pigment, a phthalimidomethylated quinacridone-based compound, a styrene-based resin, a humectant and an alkali metal hydroxide is kneaded by a high shear force in the kneading step, the quinacridone-based pigment is crushed into fine particles and, at the same time, the styrene-based resin provided with water dispersibility in the presence of the alkali metal hydroxide is effectively adsorbed onto the surface of the finely ground quinacridone-based pigment, and thus the surface of the pigment is coated. Since the styrene-based resin used in the present invention contains a high content, 60% by mass or more, of a styrene-based monomer unit, it shows good adsorption onto the hydrophobic surface of the pigment, and the encapsulation of the pigment due to the resin smoothly proceeds. Consequently, pigment particles encapsulated efficiently in the kneading step are rapidly dispersed in the aqueous medium in the dispersing step. At the same time, in the kneading step, the phthalimidomethylated quinacridone-based compound as the auxiliary dispersant is used. In the kneading step under a high shear force, the phthalimidomethylated quinacridone-based compound is satisfactorily adsorbed onto the surface of the quinacridone-based pigment, and dispersion stability of the water-based pigment dispersion is improved when the kneaded mixture is dispersed by a repulsive force due to steric hindrance. A water-based ink for ink-jet recording, which contains pigment particles having a very small particle size and is excellent in dispersion stability, can be efficiently produced by further diluting the resulting water-based pigment dispersion with an aqueous medium and optionally adding various additives, and thus the present invention is very effective from industrial points of view.

The present invention also provides a water-based pigment dispersion for ink-jet ink produced by the above method.

The present invention also provides an ink composition for ink-jet recording including, as a main component, the water-based pigment dispersion for ink-jet ink produced by the above method of the present invention.

BEST MODE FOR CARRYING OUT THE INVENTION

Now the respective components used in the kneading step and the dispersing step will be described and also the respective steps will be described in more detail.

(1) Styrene-based Resin

The styrene-based resin used in the present invention is a resin which has (i) 60% by mass or more of a styrene-based monomer unit based on all monomer components, (ii) a monomer unit containing an unsaturated aliphatic carboxylic acid having a radical polymerizable double bond, an acid value of 50 to 300 and a weight-average molecular weight of 7500 to 40000.

As used herein, the weight-average molecular weight is a value, as measured by a GPC (gel permeation chromatography) method, reduced in terms of a molecular mass of polystyrene used as a certified reference substance.

The measurement was carried out by the following apparatus and conditions.

Delivery pump: manufactured by Shimadzu Corporation under the trade name of "LC-9A", System controller: manufactured by Shimadzu Corporation under the trade name of "SIL-6B", Auto-injector: manufactured by Shimadzu Corporation under the trade name of "SIL-6B", Detector: manufactured by Shimadzu Corporation under the trade name of "RID-6A"

Data processing software: manufactured by System Instruments Co., Ltd., under the trade name of "Sic480II Data Station"

Column: manufactured by Hitachi Chemical Co., Ltd. under the trade name of "GL-R400 (Gard Column)"+"GL-R440"+"GL-R450"+"GL-R400M", Eluent: THF, Flow rate: 2 ml/min, Column temperature: 35° C.

Since the styrene-based resin used in the present invention contains a large amount of the styrene-based monomer unit, it shows good adsorptivity to the hydrophobic surface of pigment, and thus the surface of the pigment can be satisfactorily coated in the form of a capsule.

As the styrene-based monomer, known compounds can be used. For example, there can be used alkylstyrenes such as styrene, $\alpha$-methylstyrene, $\beta$-methylstyrene, 2,4-dimethylstyrene, $\alpha$-ethylstyrene, $\alpha$-butylstyrene and $\alpha$-hexylstyrene; halogenated styrenes such as 4-chlorostyrene, 3-chlorostyrene and 3-bromostyrene; and 3-nitrostyrene, 4-methoxystyrene and vinyltoluene.

The content of the styrene-based monomer unit as a material of the styrene-based resin is preferably from 60 to 90% by mass, and particularly preferably from 70 to 90% by mass. When the content of the styrene-based monomer is less than 60% by mass, affinity of the styrene-based resin to the quinacridone-based pigment becomes insufficient and thus dispersion stability of the water-based pigment dispersion for ink-jet ink may be lowered. Also plain paper recording properties of the water-based ink for ink-jet recording composition obtained from water-based pigment dispersion may be lowered and the image recording density may be lowered and, furthermore, the water resistance may be lowered. On the other hand, when the content of the styrene-based monomer is within the above range, dispersibility of the styrene-based resin in an aqueous medium can be improved and dispersibility and dispersion stability of the pigment in the water-based pigment dispersion for ink-jet ink can be improved. Furthermore, printing stability is improved when used as the water-based ink composition for ink-jet recording.

As the unsaturated aliphatic carboxylic acid having a radical polymerizable double bond to be copolymerized with the styrene-based monomer, known compounds can be used. Examples thereof include acrylic acid, methacrylic acid, $\alpha$-ethylacrylic acid, crotonic acid, $\alpha$-methylcrotonic acid, $\alpha$-ethylcrotonic acid, isocrotonic acid, maleic acid, fumaric acid, itaconic acid, citraconic acid, measaconic acid and glutaconic acid. Among these compounds, acrylic acid or methacrylic acid are preferably used, and the two are particularly preferably used in combination. By using acrylic acid in combination with methacrylic acid, copolymerizability on synthesis of the resin is improved and thus uniformity of the resin is improved. Consequently, there may be obtained a pigment dispersion which is excellent in storage stability and contains finely ground particles.

As the monomer of the styrene-based resin in the present invention, three kinds of monomers such as styrene-based monomer, acrylic acid and methacrylic acid are preferably used. The total content thereof is preferably 95% by mass or more based on all monomer components so as to enhance dispersibility and to increase a glass transition point.

As the styrene-based resin, for example, known monomers other than the styrene-based monomer and the unsaturated aliphatic carboxylic acid having a radical polymerizable double bond can be used. Examples of the monomer include acrylate esters and methacylate esters, such as methyl acrylate, n-propyl acrylate, isopropyl acrylate, sec-butyl acrylate, tert-butyl acrylate, 2-ethylbutyl acrylate, 1,3-dimethylbutyl acrylate, hexyl acrylate, 2-ethylhexyl acrylate, octyl acrylate, methyl methacrylate, ethyl methacrylate, n-butyl methacrylate, 2-methylbutyl methacrylate, pentyl methacrylate, heptyl methacrylate and nonyl methacrylate; acrylate ester derivatives and methacrylate ester derivatives, such as 3-ethoxypropyl acrylate, 3-ethoxybutyl acrylate, dimethylaminoethyl acrylate, hydroxyethyl acrylate, hydroxybutyl acrylate, ethyl-$\alpha$-(hydroxymethyl) acrylate, dimethylaminoethyl methacrylate, hydroxyethyl methacrylate and hydroxypropyl methacrylate; acrylic acid aryl esters and acrylic acid aralkyl esters, such as phenyl acrylate, benzyl acrylate, phenylethyl acrylate and phenylethyl methacrylate; monoacrylate esters or monomethacrylate esters of polyhydric alcohol, such as diethylene glycol, triethylene glycol, polyethylene glycol, glycerin and bisphenol A; maleic acid dialkyl esters such as dim ethyl maleate and diethyl maleate, and vinyl acetate. One or more kinds of these monomers can be added as a monomer component.

The weight-average molecular weight of the styrene-based resin used in the present invention is within a range from 7500 to 40000, and more preferably from 7500 to 30000. The weight-average molecular weight is particularly preferably within a range from 10000 to 25000. When the weight-average molecular weight is less than 7500, initial dispersion and reduction in particle size of the quinacridone-based pigment can be easily conducted. However, long-term storage stability of the water-based pigment dispersion for ink-jet ink may be lowered and sedimentation due to aggregation of the pigment may occur. On the other hand, when the weight-average molecular weight of the styrene-based resin is more than 40000, the viscosity of the ink composition for ink-jet recording prepared from the water-based pigment dispersion for ink-jet ink containing the same increases and ejection stability of the ink may be reduced especially in thermal jet type ink-jet recording.

The glass transition point of the styrene-based resin is preferably 90° C. or higher, and is more preferably within a range from 100° C. to 150° C. When the glass transition point is 90° C. or higher, thermostability of the ink composition is improved. Therefore, even when the water-based ink for ink-jet recording composition prepared from the water-based pigment dispersion is used for thermal jet type ink-jet recording, there may not arise a change in properties, which causes ink ejection failure due to repeated heating, and thus it is preferred.

As a method of producing the styrene-based resin, a conventional polymerization method can be employed and examples thereof include a method of polymerization reaction in the presence of a polymerization catalyst, for example, solution polymerization, suspension polymerization or bulk polymerization. Examples of the polymerization catalyst include 2,2'-azobis(2,4-dimethylvaleronitrile), 2,2'-azobisisobutyronitrile, 1,1'-azobis(cyclohexane-1-carbonitrile), benzoyl peroxide, dibutyl peroxide and butylperoxy benzoate. The content is preferably form 0.1 to 10.0% by mass based on the vinyl monomer component.

The styrene-based resin used in the present invention may be a random copolymer or a graft copolymer. The graft copolymer includes, for example, a graft copolymer in which a copolymer of styrene and nonionic monomer copolymerizable with styrene or polystyrene constitutes a stem or branch, and a copolymer of acrylic acid, methacrylic acid and the other monomer including styrene constitutes a branch or stem. The styrene-based resin may be a mixture of the graft copolymer and the random copolymer.

(2) Quinacridon-based Pigment

As the quinacridone-based pigment in the present invention, any conventionally known one can be used. Specific examples thereof include dimethylquinacridone-based pigments such as C.I. Pigment Red 122; dichloroquinacridone-based pigments such as C.I. Pigment Red 202 and C.I. Pigment Red 209; non-substituted quinacridones such as C.I. Pigment Violet 19; and mixtures or solid solutions of at least two kinds of pigments selected from among these pigments. The pigment may be a dry pigment in the form of powder, granule or bulk, or may be in the form of a wet cake or slurry. Among the quinacridone-based pigments, C.I. Pigment Red 122 is preferable.

(3) Alkali Metal Hydroxide

As the alkali metal hydroxide in the present invention, for example, sodium hydroxide, potassium hydroxide and lithium hydroxide can be used. Among these, potassium hydroxide is preferably used. The amount of the alkali metal hydroxide is preferably 0.8 to 1.2 times the amount required to neutralize all carboxyl groups of the styrene-based resin. By neutralizing carboxyl groups in the styrene-based resin used in the present invention with the alkali metal hydroxide during kneading, excellent water dispersibility is attained.

(4) Auxiliary Dispersant

The phthalimidomethylated quinacridone-based compound used in the present invention can be synthesized, for example, by reacting non-substituted quinacridone, dimethylquinacridone or dichloroquinacridone with phthalimide and aldehyde in concentrated sulfuric acid, and is preferably a compound represented by the following formula (I):

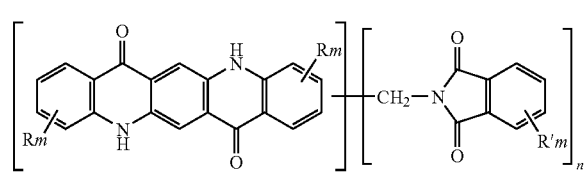

wherein R and R' each independently represents hydrogen, halogen, C1-C5 alkyl or C1-C5 alkoxy, m represents 0, 1 or 2, and n represents 1 to 4.

n is more preferably from 1 to 2.

Specific examples of more preferred compounds among the compounds represented by the formula (I) include compounds represented by the following formula (III) having a group represented by the following formula (II):

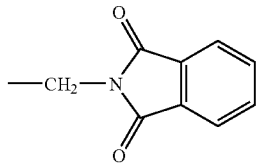

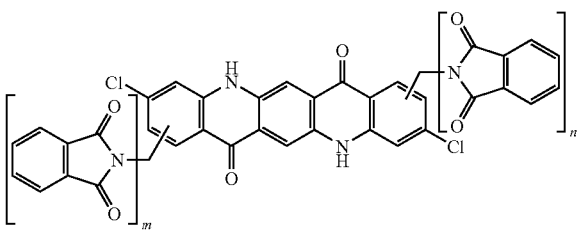

wherein m and n each independently represents 0, 1 or 2, provided that m and n are not simultaneously 0.

Most preferred compound used in the present invention is a compound having 1 to 2 groups represented by the formula (II) per molecule on average. The compound is particularly preferably a compound having 1 to 1.5 groups per molecule on average. When the number of the group represented by the formula (II) is less than 1 per molecule on average, the effect on dispersion stability may not be exerted. On the other hand, when the number of the group is more than 2 per molecule on average, characteristics of the ink composition for ink-jet recording may be reduced, for example, bleeding occurs.

In the present invention, the content of the phthalimidomethylated quinacridone-based compound is preferably from 1 to 20% by mass, and more preferably from 2 to 15% by mass, based on the total amount of the quinacridone-based pigment and the phthalimidomethylated quinacridone-based compound. When the content of the phthalimidomethylated quinacridone-based compound is less than 1% by mass, the effect of using in combination may be exerted with difficulty. On the other hand, when the content is more than 20% by mass, storage stability of the pigment dispersion for ink-jet ink and ink composition for ink-jet recording may be drastically reduced.

Another one of the auxiliary dispersants used in the present invention is a quinacridonesulfonic acid-based compound. As the quinacridonesulfonic acid-based compound, a conventionally known one can be used. Examples thereof include quinacridonesulfonic acids obtained by reacting non-substituted quinacridone, dimethylquinacridone or dichloroquinacridone with concentrated sulfuric acid using a known method; and metal salts thereof, such as sodium, aluminum and calcium salts; and ammonium salts thereof, such as ammonium, octadecylammonium, didodecylammonium, dimethyloctadecylammonium, dimethyldioctadecylammonium and benzyldimethyloctadecylammonium salts.

Among these, alkali metal salt is preferable.

More specifically, the quinacridonesulfonic acid-based compound used in the present invention is preferably an alkali metal salt of 3,10-dichloroquinacridone sulfonic acid, and more preferably sodium 3,10-dichloroquinacridonesulfonate.

In the present invention, the phthalimidomethylated quinacridone-based compound and the quinacridonesulfonic acid-based compound are not included in the quinacridone-based pigment.

(5) Humectant

As the humectant in the present invention, there can be used known humectants which have hitherto been used in the water-based ink for ink-jet recording. Examples of the humectant include polyols such as glycerin, ethylene glycol, diethylene glycol, triethylene glycol, tetraethylene glycol, polyethylene glycol, propylene glycol, dipropylene glycol, polypropylene glycol, 1,3-propanediol, 1,4-butanediol, 1,5-pentanediol, 1,6-hexanediol, 1,2-hexanediol, 1,2,6-hexanetriol, trimethylolpropane and pentaerythritol; polyhydric alcohol alkyl ethers such as diethylene glycol monobutyl ether, tetraethylene glycol monomethyl ether and propylene glycol monoethyl ether; and polyhydric alcohol aryl ethers such as ethylene glycol monophenyl ether and ethylene glycol monobenzyl ether.

These humectants usually serve as a poor solvent to the styrene-based resin used in the present invention, and dispersibility of the styrene-based resin during kneading is improved by adding the alkali metal hydroxide. Therefore, a satisfactory solid and colored kneaded mixture containing the quinacridone-based pigment and the styrene-based resin is formed by kneading in the presence of the humectant.

One or more kinds of these humectants can be used in combination. When using a humectant having a boiling point of 170° C. or higher, preferably 200° C. or higher, the humectant is less likely to be vaporized during the kneading operation and kneading can be allowed to proceed while maintaining the solid content of the colored kneaded mixture. The humectant also serves as a humectant and a drying inhibiting agent in the water-based pigment dispersion and the water-based ink for ink-jet recording, and is preferably polyhydric alcohols having high boiling point, low volatility and high surface tension, which are liquid at normal temperature, and more preferably glycols such as diethylene glycol and triethylene glycol. By kneading using such a humectant, kneading can be conducted with good reproducibility without causing vaporization of the humectant even in the case of a kneading operation for a long period.

The respective steps of the following method of the present invention will now be described in detail.

(6) Method of Producing Water-based Pigment Dispersion

The kneading step and the dispersing step in the present invention as well as the method of using auxiliary dispersants such as phthalimidomethylated quinacridone-based compound and quinacridonesulfonic acid-based compound will now be described in detail.

a. Kneading Step

In the kneading process of the present invention, a mixture containing a pigment, a phthalimidomethylated quinacridone-based compound, a styrene-based resin having 60% by mass or more of a styrene-based monomer unit, a monomer unit containing an unsaturated aliphatic carboxylic acid having a radical polymerizable double bond, an acid value of 50 to 300 and a weight-average molecular weight of 7500 to 40000, an alkali metal hydroxide and a humectant is kneaded. In the kneading step, dispersibility is enhanced by neutralizing carboxyl groups in the styrene-based resin and also the resin is swollen by the humectant thereby to soften the surface to form a mass made of a mixture together with the quinacridone-based pigment. Since the mixture is solid at normal temperature but is remarkably viscous at the kneading temperature of 50 to 90° C., a large shear force can be applied to the mixture during kneading and the quinacridone-based pigment is crushed into fine particles, while the surface of the fine particles are coated with the styrene-based resin. The phthalimidomethylated quinacridone-based compound is effectively adsorbed onto the surface of the quinacridone-based compound crushed by kneading under a high shear force.

In the kneading step, the kneading temperature (Mt) can be appropriately adjusted according to the temperature characteristics of the styrene-based resin so as to enable kneading under a high shear force. Kneading is preferably carried out at the temperature which satisfies the following relationship:

$$Tg-40 \leq Mt \leq Tg$$

where Mt is a kneading temperature and Tg is a glass transition point of a styrene-based resin.

By kneading at the kneading temperature which satisfies the above relationship, kneading viscosity does not decrease by melting of the resin during kneading and the shear force does not decrease, resulting in sufficient kneading. Less liquid component is vaporized and the solid content of the colored kneaded mixture increases with difficulty after the completion of kneading. Furthermore, by kneading at the kneading temperature (Mt), which is at least 40° C. lower than the glass transition point (Tg), the resin and the pigment are integrated at an initial stage of the kneading and the subsequent kneading step proceeds remarkably efficiently. As used herein, the kneading temperature refers to a temperature of the inner surface of the vessel through which a mixture is kneaded with the blade in the kneading step. The temperature of the kneaded mixture itself reaches the temperature higher than the temperature of the inner surface of the vessel by applying shear force energy. The kneaded mixture obtained after the completion of kneading contains a large content of a liquid component, and ground and encapsulated quinacridone-based pigment in the kneading step is easily dispersed in the aqueous medium in the subsequent dispersing step. Therefore, the resin, with which the pigment is coated, and the auxiliary dispersant adsorbed onto the pigment are less likely to be eliminated and they prevent aggregation of the quinacridone-based pigment dispersed in the aqueous medium, thereby improving dispersion stability.

In the method of producing the water-based pigment dispersion of the present invention, it is preferred to use in combination with the quinacridonesulfonic acid-based compound as the auxiliary dispersant in view of improvement in dispersion stability, and the quinacridonesulfonic acid-based compound can be used with the phthalimidomethylated quinacridone-based compound in the kneading step.

In the kneading process of the method of producing the water-based pigment dispersion of the present invention, since the styrene-based resin is softened in the swollen state in the presence of an alkali metal hydroxide and a humectant, the addition of a solvent for dissolving the resin and the process for distilling off the solvent after kneading are not required, and thus high production efficiency is attained.

The method of the present invention, capable of performing efficient kneading at the temperature lower than the glass transition temperature of the resin, is suited for preparation of a water-based pigment dispersion containing a resin having high Tg, which is considered to be kneaded with difficulty because it is not melted with ease, and is also suited for preparation of the water-based ink for ink-jet recording used for thermal jet type ink-jet recording. By using this method, a resin having high glass transition point suited for a thermal jet type ink composition for ink-jet recording can be kneaded at low temperature and dispersed in an aqueous medium, and thus a water-based pigment dispersion having excellent thermostability can be prepared with ease.

In the kneading process of the present invention, in order to maintain the solid content during kneading within a fixed value and to constantly apply a stable shear force to the colored kneaded mixture, a close type kneader capable of suppressing vaporization of the humectant or a kneader capable of serving as the close type kneader is preferably used, and a kneader equipped with a stirring tank, a lid of the stirring tank, and a monoxial or multiaxial stirring blade is more preferably used. Although the number of the stirring blade is not specifically limited, those having two or more stirring blades are preferably used so as to obtain high kneading action.

By using a kneader with such a configuration, after preparing a colored kneaded mixture for water-based pigment dispersion through the kneading step, a water-based pigment dispersion can be prepared by directly diluting the kneaded mixture in the same stirring tank without being taken out, and by subjecting to an initial dispersion step while stirring, then to a final dispersion step.

Examples of the kneader include a Henschel mixer, pressurizing kneader, Banbury mixer and planetary mixer, and a planetary mixer is particularly preferable. The planetary mixer refers to a planetary type kneading apparatus and is a general term for a kneading apparatus having a stirring blade for planetary movement (hereinafter referred to as a planetary mixer).

In the method of the present invention, since a colored kneaded mixture having high solid content, which contains a pigment and a resin, is kneaded, the viscosity varies within a wide range according to the kneaded state of the kneaded mixture. Particularly, the planetary mixer can cope with the viscosity ranging from low viscosity to high viscosity, and the operations in the stage expanding from the initiation of the kneading process to the subsequent dilution which is the transferring step to the dispersing process carried out in the same apparatus. Furthermore, the humectant is added with ease and vacuum distillation can be carried out, and also viscosity and shear force can be adjusted with ease during kneading.

As described above, it is possible to gradually orient an anionic hydrophilic group in the resin, wherein the surface of the pigment is coated in the form of a capsule, to the direction of a peripheral aqueous medium while maintaining the encapsulated state by continuously diluting kneaded mixture manufactured at the kneading step, and thus realizing the coated state which is excellent in wettability to the aqueous medium and is stable.

In the method of the present invention, in order to efficiently perform kneading with the quinacridone-based pigment under high viscosity while maintaining the swollen state of the styrene-based resin, the solid content of the kneaded mixture containing the styrene-based resin, the quinacridone-based pigment, the phthalimidomethylated quinacridone-based compound and the quinacridonesulfonic acid-based compound during kneading is preferably within a range from 50 to 80% by mass, and more preferably from 60 to 80% by mass. When the solid content is less than 50% by mass, since the viscosity of the mixture decreases, sufficient kneading may not be conducted and the pigment may not be crushed sufficiently. By maintaining the solid content within a range from 50 to 80% by mass, reasonably high viscosity of the colored kneaded mixture is maintained during kneading and a shear force applied to the colored kneaded mixture by the kneader is increased, and thus grinding of the pigment in the colored kneaded mixture and coating of the pigment with the resin are allowed to process simultaneously. When the solid content is more than 80% by mass, even if the resin is sufficiently softened by heating, kneading may be carried out with difficulty and the colored kneaded mixture may not be easily dispersed in the aqueous medium in the dispersing step.

In the kneading step, kneading may be conducted after appropriately adding water, in addition to the humectant.

In the case of preparing a colored kneaded mixture for ink-jet ink in the kneading process of the present invention, the amount of the styrene-based resin is preferably from 10 to 50 parts by mass, and more preferably from 10 to 40 parts by mass, based on 100 parts by mass of the total amount of the quinacridone-based pigment, the phthalimidomethylated quinacridone-based compound and the quinacridonesulfonic acid-based compound in the colored kneaded mixture. When the amount of the styrene-based resin is less than 10 parts by mass, dispersion stability of the water-based pigment dispersion for ink-jet ink may be reduced and, when the ink composition for ink-jet recording is prepared, abrasion resistance of printed matter may be reduced. On the other hand, when the amount is more than 50 parts by mass, viscosity of the ink composition for ink-jet recording may increase excessively.

The alkali metal hydroxide used in the kneading step is added as an aqueous solution or an organic solvent solution of the alkali metal hydroxide. In this case, the content of the aqueous solution or organic solvent solution of the alkali metal hydroxide is preferably from 20% to 50% by mass. As the organic solvent which dissolves the alkali metal hydroxide, alcohol solvents such as methanol, ethanol and isopropanol are preferably used. Particularly, an aqueous solution of the alkali metal hydroxide is preferably used in the method of the present invention.

The amount of the alkali metal hydroxide is 0.8 to 1.2 times the amount required to neutralize all carboxyl groups of the styrene-based resin.

The amount of the humectant in the kneading step is preferably within a range from 40 to 80 parts by mass based on 100 parts by mass of the total amount of the quinacridone-based pigment, the phthalimidomethylated quinacridone-based compound and the quinacridonesulfonic acid-based compound. When the amount of the humectant is more than 80 parts by mass, the solid content decreases and thus it may become impossible to apply sufficient shear force. On the other hand, when the amount is less than 40% by mass, it becomes difficult to fuse solids to form a mixture suited for kneading, and thus it may become impossible to apply sufficient shear force. Consequently, it may become difficult to sufficiently grind the quinacridone-based pigment and adsorb the styrene-based resin onto the surface and thus a uniform colored kneaded mixture for ink-jet ink may not be obtained.

The content of the humectant varies depending on the resin to be used, but is preferably from 10 to 50% by mass, and more preferably from 20 to 40% by mass, based on the mixture. The amount of the humectant varies depending on the humectant to be used, but is ½ to 5 times, preferably 2 to 4.5 times, the amount of the resin. When the amount of the humectant is less than ½ times the amount of the resin, the resin cannot be softened by converting into the swollen state suited for kneading and thus dispersion stability of the pigment may be reduced. On the other hand, when the amount is more than 5 times, since the viscosity of the mixture during kneading may be reduced and sufficient kneading cannot be conducted, dispersibility of the pigment may be reduced and thus deterioration of image quality such as ejection failure may occur when the water-based ink for ink-jet recording is prepared.

b. Dispersing Step

The colored kneaded mixture for water-based pigment dispersion obtained after the completion of the kneading step is a kneaded mixture which is solid at normal temperature. In the dispersing step, this colored kneaded mixture for ink-jet ink is diluted with an aqueous medium and then subjected to a dispersion treatment to obtain a water-based pigment dispersion for ink-jet ink. By subjecting to the dispersion treatment, coarse dispersed particles in the water-based pigment dispersion for ink-jet ink are further ground and the particle size of dispersed particles are diminished, and thus ink-jet characteristics such as ejection stability and print density of the ink composition for ink-jet recording are improved. In the method of the present invention, since the quinacridone-based pigment in the colored kneaded mixture for ink-jet ink in the dispersing step has already been crushed in the kneading step and coated with the resin as the dispersant and, furthermore, auxiliary dispersants such as phthalimidomethylated quinacridone-based compound and quinacridonesulfonic acid-based compound are adsorbed onto the surface of the pigment, dispersibility to water is improved. Therefore, the quinacridone-based pigment is easily dispersed in the aqueous medium within a short time and production efficiency is improved.

In the method of producing the water-based pigment dispersion of the present invention, the quinacridonesulfonic acid-based compound may be used in combination, as the auxiliary dispersant, so as to improve dispersion stability and the quinacridonesulfonic acid-based compound may be added in the dispersing step. When the quinacridonesulfonic acid-based compound is added in the dispersing step, it is uniformly dispersed in the aqueous medium, together with the colored kneaded mixture which has been subjected to the kneading step, and then spread over the surface of the quinacridone-based pigment and adsorbed onto the surface.

When the quinacridonesulfonic acid-based compound is used in the dispersing step, preferably, only the colored kneaded mixture is dispersed in the aqueous medium and then the quinacridonesulfonic acid-based compound is added and the subsequent dispersing step is performed.

When using the phthalimidomethylated quinacridone-based compound in combination with the quinacridonesulfonic acid-based compound, preferably, a colored kneaded mixture is prepared using both auxiliaries from the kneading step and then the kneaded mixture is dispersed in the aqueous medium to obtain a water-based pigment dispersion for ink-jet ink because dispersion stability is more improved.

In the present invention, each amount of the phthalimidomethylated quinacridone-based compound and the quinacridonesulfonic acid-based compound is 2 parts by mass based on 100 parts by mass of the quinacridone-based pigment. When using the phthalimidomethylated quinacridone-based compound in combination with the quinacridonesulfonic acid-based compound, the total amount is preferably from 4 to 20 parts by mass, and more preferably from 4 to 15 parts by mass. When the amount is within the above range, the resulting water-based pigment dispersion for ink-jet ink and ink composition for ink-jet recording are excellent in storage stability.

The content of the quinacridone-based pigment in the water-based pigment dispersion for ink-jet ink is preferably from 5 to 25% by mass, and more preferably from 5 to 20% by mass. When the content of the quinacridone-based pigment is less than 5% by mass, the ink composition for ink-jet recording prepared from the water-based pigment dispersion for ink-jet ink may not be sufficiently colored and sufficient image density may not be obtained. On the other hand, when the content is more than 25% by mass, dispersion stability of the pigment may be reduced in the water-based pigment dispersion for ink-jet ink.

In the present invention, the aqueous medium contains water or water and a humectant as a main component. The humectant used herein may be the same as that used during kneading in the first step.

The disperser used in the dispersing step may be a known one, and examples of the disperser using media include paint shaker, ball mill, Nano mill, attritor, basket mill, sand mill, sand grinder, Dinomill, Dispermat, SC mill, spike mill and agitator mill. Examples of the disperser using no media include ultrasonic homogenizer, high-pressure homogenizer, nanomizer, altimizer, dissolver, disper and high-speed impeller disperser, and these dispersers may be used alone or in combination. Among these dispersers, dispersers using media are preferable because of high dispersion capability. After dispersion, the concentration may be adjusted with the aqueous medium, if necessary.

According to the kind of the disperser to be used, before subjecting to dispersion (final dispersion) using the disperser, the viscosity is previously adjusted to viscosity suited for treatment using the disperser by optionally adding an aqueous medium to the colored kneaded mixture, which has been subjected to the kneading step, followed by mixing and further dilution (hereinafter, a kneaded mixture of which viscosity was adjusted may be referred to as a kneaded mixture having adjusted viscosity). When using a kneading apparatus equipped with a stirring tank and a stirring blade in the kneading step, the viscosity can be adjusted in the stirring tank before taking out the colored kneaded mixture.

When using a sand mill, the kneaded mixture is preferably transferred to the sand mill and then dispersed after adjusting the viscosity to several tens to several hundreds of mPa·sec by controlling the solid content to 10 to 40% by mass.

The aqueous medium used in the case of diluting the colored kneaded mixture may contain a humectant because it is necessary to prevent drying of the water-based pigment dispersion for ink-jet ink and to adjust the viscosity when a dispersion treatment is carried out. The total content of the humectant used in the case of diluting the colored kneaded mixture and that contained in the colored kneaded mixture for ink-jet ink is preferably 3 to 50% by mass, and more preferably from 5 to 40% by mass, based on the water-based pigment dispersion for ink-jet ink. When the content is less than 3% by mass, the effect of inhibiting drying may be lowered. On the other hand, when the content is more than 50% by mass, dispersion stability of the dispersion may be lowered. The humectant used to prepare the colored kneaded mixture for ink-jet ink and the humectant contained in the aqueous medium which is used to dilute the colored kneaded mixture may be the same or different.

(7) Preparation of Ink Composition for Ink-jet Recording

The ink composition for ink-jet recording of the present invention can be prepared by further diluting the water-based pigment dispersion thus obtained with an aqueous medium. The content of the quinacridone-based pigment is preferably from 2 to 10% by mass based on the ink composition for ink-jet recording prepared from the water-based pigment dispersion for ink-jet ink of the present invention because it is necessary to obtain sufficient image density and to secure dispersion stability of dispersed particles in the ink.

When the aqueous medium used to dilute the water-based pigment dispersion preferably contains the humectant, the humectant contributes to prevention of drying, adjustment of the viscosity and adjustment of the content in the ink composition for ink-jet recording. The aqueous medium includes, for example, the same aqueous medium as that used to disperse the colored kneaded mixture for the water-based pigment dispersion. The content of the humectant used for the purpose inhibiting drying is preferably from 3 to 50% by mass based on the ink.

In the case of preparing an ink composition for ink-jet recording, penetrants can be added for the purpose of improving permeability to the medium to be recorded and adjusting dot size on a recording medium.

Examples of the penetrant include lower alcohols such as ethanol and isopropyl alcohol; ethylene oxide adducts of alkyl alcohol, such as ethylene glycol hexyl ether and diethylene glycol butyl ether; and propylene oxide adducts of alkyl alcohol, such as propylene glycol propyl ether. The content of the penetrant is preferably from 0.01 to 10% by mass based on the ink.

In the case of preparing an ink composition for ink-jet recording, surfactants can be added so as to adjust ink properties such as surface tension. Examples of the surfactant include, but are not limited to, various anionic surfactants, nonionic surfactants, cationic surfactants and amphoteric surfactants. Among these surfactants, anionic surfactants and nonionic surfactants are preferable.

Examples of the anionic surfactant include alkylbenzenesulfonic acid salt, alkylphenylsulfonic acid salt, alkylnaphthalenesulfonic acid salt, higher fatty acid salt, sulfate ester salt of higher fatty acid ester, sulfonic acid salt of higher fatty acid ester, sulfate ester salt and sulfonic acid salt of higher alcohol ether, higher alkyl sulfosuccinic acid salt, polyoxyethylene alkyl ether carboxylic acid salt, polyoxyethylene alkyl ether sulfuric acid salt, alkyl phosphoric acid salt and polyoxyethylene alkyl ether phosphoric acid salt. Specific examples thereof include dodecylbenzenesulfonic acid salt, isopropylnaphthalenesulfonic acid salt, monobutylphenylphenolmonosulfonic acid salt, monobutylbiphenylsulfonic acid salt and dibutylphenylphenoldisulfonic acid salt.

Examples of the nonionic surfactant include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, sucrose fatty acid ester, polyoxyethylene alkylamine, polyoxyethylene fatty acid amide, fatty acid alkyloamide, alkyl alkanolamide, acetylene glycol, oxyethylene adduct of acetylene glycol and polyethylene glycol-polypropylene glycol block copolymer. Among these surfactants, polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylolamide, acetylene glycol, oxyethylene adduct of acetylene glycol and polyethylene glycol-polypropylene glycol block copolymer are preferable.

As the other surfactant, for example, there can be used silicone-based surfactants such as polysiloxaneoxyethylene adduct; fluorine surfactants such as perfluoroalkylcarboxylic acid salt, perfluoroalkylsulfonic acid salt and oxyethylene perfluoroalkyl ether; and biosurfactants such as spiculisporic acid, rhamnolipid and lysolecithin. These surfactants can be used alone or in combination. Taking account of dissolution stability of the surfactant, HLB is preferably within a range from 7 to 20.

When the surfactant is added, the content is preferably within a range from 0.001 to 1% by mass, more preferably from 0.001 to 0.5% by mass, and most preferably from 0.01 to 0.2% by mass, based on the entire mass of the ink composition for ink-jet recording. When the content of the surfactant is less than 0.001% by mass, the effect of adding the surfactant may not be exerted. On the other hand, when the content is more than 1% by mass, there may cause problems such as bleeding.

In the case of preparing an ink composition for ink-jet recording using the water-based pigment dispersion for ink-jet ink of the present invention, antiseptics, viscosity adjustors, pH adjustors, chelating agents, plasticizers, antioxidants and ultraviolet absorbers can be added, if necessary.

In the case of preparing an ink composition for ink-jet recording, since coarse particles can cause clogging of a nozzle and deterioration of other image quality, the coarse particles may be removed by centrifugal separation or filtration treatment after preparing the ink.

The ink composition for ink-jet recording can be preferably used as an ink for ink-jet recording. Examples of the ink-jet system to which the ink composition is applied include, but are not limited to, known systems, for example, continuous systems such as charge control type system and spray type system; and drop on-demand type systems such as piezo type system, thermal type system and electrostatic attraction type system. It is preferred to apply to a thermal ink-jet recording type printer.

EXAMPLES

The present invention will now be described in detail by way of examples. In the examples, parts and percentages are by mass unless otherwise specified. Resins used in the examples and comparative examples are as follows.

Resin A: resin including monomers in a ratio of styrene/acrylic acid/methacrylic acid=77/10/13 (mass ratio) having a weight-average molecular weight of 7700, an acid value of 151 mgKOH/g and a glass transition point of 107° C.

Resin B: resin including monomers in a ratio of styrene/acrylic acid/methacrylic acid=77/10/13 (mass ratio) having a weight-average molecular weight of 11000, an acid value of 152 mgKOH/g and a glass transition point of 107° C.

Resin C: resin including monomers in a ratio of styrene/acrylic acid/methacrylic acid=77/10/13 (mass ratio) having a weight-average molecular weight of 20000, an acid value of 151 mgKOH/g and a glass transition point of 107° C.

Resin D: resin including monomers in a ratio of styrene/methacrylic acid=77/23 (mass ratio) having a weight-average molecular weight of 10700, an acid value of 146 mgKOH/g and a glass transition point of 116° C.

Resin E: resin including monomers in a ratio of styrene/acrylic acid/methacrylic acid=77/10/13 (mass ratio) having a weight-average molecular weight of 5000, an acid value of 150 mgKOH/g and a glass transition point of 107° C.

Resin F: resin including monomers in a ratio of styrene/acrylic acid/methacrylic acid=77/10/13 (mass ratio) having a weight-average molecular weight 45000, an acid value of 153 mgKOH/g and a glass transition point of 107° C.

Resin G: resin including monomers in a ratio of styrene/methyl methacrylate/acrylic acid/methacrylic acid=50/27/10/13 (mass ratio) having a weight-average molecular weight of 12000, an acid value of 149 mgKOH/g and a glass transition point of 109° C.

To confirm the effect exerted when phthalimidomethylated 3,10-dichloroquinacridone is used as a phthalimidomethylated quinacridone-based compound, water-based pigment dispersions shown in the following examples and comparative examples were prepared.

Example 1

A mixture with the following composition was charged in a planetary mixer (manufactured by Inoue Seisakusho under the trade name of "PLM-V-50V") having a volume of 50 L and, after heating a jacket, the mixture was kneaded at a low speed (rotation speed: 21 rpm, revolution speed: 14 rpm) until the temperature of contents reached 60° C. After changing to high speed (rotation speed: 35 rpm, revolution speed: 24 rpm), kneading was continued.

| | |
|---|---|
| Resin A | 750 g |
| Quinacridon-based pigment (manufactured by DAINIPPON INK AND CHEMICALS, INCORPORATED under the trade name of "FASTOGEN SUPER MAGENTA RTS") | 4630 g |
| Phthalimidomethylated 3,10-dichloroquinacridone (average number of phthalimidemethyl group per molecule: 1.4) | 380 g |
| Diethylene glycol | 2700 g |
| Aqueous 34% by mass potassium hydroxide solution | 333 g |
| Ion-exchanged water | 200 g |

On changing to high speed, a current value of a planetary mixer was 5 A. After kneading was continued, a maximum current value of the planetary mixer was 15 A. After kneading was continued for one hour since the maximum current value was attained, the current value of the planetary mixer was 10 A. To the resulting kneaded mixture in a stirring tank, 200 g of ion-exchanged water heated to 60° C. was added and kneading was continued. Uniform mixing was confirmed and, after an additional one hour, 200 g of ion-exchanged water heated to 60° C. was added, followed by uniform mixing and further continuous kneading.

Kneading was continued for 4 hours since the observation of the maximum current value to obtain a colored resin composition. To the resulting colored resin composition, 6400 g of ion-exchanged water heated to 60° C. was added in several portions over 2 hours while stirring using a planetary mixer.

The solid content of the colored resin composition after diluting with water was 39.0% by mass. To 12 kg of the colored resin composition taken after diluting with water, 5.83 kg of diethylene glycol and 5.57 kg of ion-exchanged water were added by several portions while stirring using a dispersion stirrer to obtain a water-based pigment dispersion precursor A-1.

18 kg of the water-based pigment dispersion precursor A-1 was dispersed by using a bead mill (manufactured by ASADA IRON WORKS CO., LTD. under the trade name of "Nano Mill NM-G2L") under the following conditions to obtain a pigment dispersion A-2.

Dispersion Conditions
Disperser: manufactured by ASADA IRON WORKS CO., LTD. under the trade name of "Nano millNM-G2L"
Beads: 0.3 mm in diameter zirconia beads
Amount of beads filled: 85%
Cooling water temperature: 10° C.
Rotation speed: 2660 rpm
(Disk peripheral speed: 12.5 m/sec)
Delivery amount: 200 g/10 sec A dispersion treatment was conducted while circulating for one hour under the above conditions. The content of the quinacridone-based pigment of the pigment dispersion A-2 was 15.8% by mass.

Example 2 to Example 4, Comparative Example 1 and Comparative Example 3 to Comparative Example 5

In substantially the same manner as in Example 1, except for the kind of the resin and use of phthalimidomethylated 3,10-dichloroquinacridone in accordance with the formulation shown in Table 1, water-based pigment dispersions B-2, C-2, D-2, E-2, G-2, H-2 and I-2 of Example 2 to Example 4, Comparative Example 1 and Comparative Example 3 to Comparative Example 5 were prepared. Details of the amount are as shown in Table 1.

TABLE 1

| | Example 1 | Example 2 | Example 3 | Example 4 |
|---|---|---|---|---|
| Resin | A | B | C | D |
| Amount of resin | 750 | 750 | 1000 | 750 |
| FASTOGEN SUPERMAGENTA RTS | 4630 | 4630 | 4750 | 4630 |
| Phthalimidomethylated 3,10-dichloroquinacridone | 380 | 380 | 250 | 380 |
| Quinacridonsulfonic acid-based compound | | | | |
| Diethylene glycol | 2700 | 2900 | 3200 | 3100 |
| Aqueous 34% by mass potassium hydroxide solution | 333 | 335 | 489 | 322 |
| Ion-exchanged water | 200 | | | |
| Additional ion-exchanged water for kneading | 400 | 800 | 300 | 300 |
| Additional ion-exchanged water for dilution | 6400 | 6200 | 6700 | 6700 |
| Solid content of colored kneaded mixture after dilution | 39% | 39.9% | 38.5% | 38.1% |
| Colored kneaded mixture after dilution | 12000 | 12000 | 12000 | 12000 |
| Diethylene glycol | 5830 | 5810 | 1350 | 1490 |
| Ion-exchanged water | 5570 | 6150 | 9750 | 9340 |
| Water-based pigment dispersion before dispersion treatment | A-1 | B-1 | C-1 | D-1 |
| Supply flow rate of dispersion to disperser | 200 g/10 sec | 185 g/10 sec | 190 g/10 sec | 195 g/10 sec |
| Content of pigment of water-based pigment dispersion | 15.8% | 15.8% | 15.4% | 15.8% |
| Water-based pigment dispersion | A-2 | B-2 | C-2 | D-2 |

TABLE 1-continued

|  | Comparative Example 1 | Comparative Example 3 | Comparative Example 4 | Comparative Example 5 |
|---|---|---|---|---|
| Resin | B | E | F | G |
| Amount of resin | 1000 | 750 | 750 | 750 |
| FASTOGEN SUPERMAGENTA RTS | 5000 | 4630 | 4630 | 4630 |
| Phthalimidomethylated 3,10-dichloroquinacridone |  | 380 | 380 | 380 |
| Quinacridonsulfonic acid-based compound |  |  |  |  |
| Diethylene glycol | 3200 | 2500 | 3300 | 3000 |
| Aqueous 34% by mass potassium hydroxide solution | 447 | 331 | 338 | 329 |
| Ion-exchanged water |  |  | 200 |  |
| Additional ion-exchanged water for kneading | 200 | 200 | 400 | 500 |
| Additional ion-exchanged water for dilution | 6000 | 6800 | 6400 | 6500 |
| Solid content of colored kneaded mixture after dilution | 40.4% | 39% | 38.4% | 39.2% |
| Colored kneaded mixture after dilution | 12000 | 12000 | 12000 | 12000 |
| Diethylene glycol | 1420 | 2000 | 1340 | 1610 |
| Ion-exchanged water | 11250 | 9400 | 9700 | 9910 |
| Water-based pigment dispersion before dispersion treatment | E-1 | G-1 | H-1 | I-1 |
| Supply flow rate of dispersion to disperser | 200 g/10 sec | 200 g/10 sec | 195 g/10 sec | 200 g/10 sec |
| Content of pigment of water-based pigment dispersion | 16% | 15.8% | 15.8% | 15.8% |
| Water-based pigment dispersion | E-2 | G-2 | H-2 | I-2 |

*unit is g unless otherwise so indicated

When high-speed kneading is conducted by using a planetary mixer during kneading in accordance with the above formulation, the temperature of the kneaded mixture was from 90 to 95° C.

In Comparative Example 2, a water-based pigment dispersion was prepared without using the kneading step.

Comparative Example 2

Preparation of Aqueous Resin Solution

In accordance with the following formulation, a methyl ethyl ketone solution of a resin B was prepared.

| Methyl ethyl ketone (abbreviated as MEK) | 50 g |
| Resin B | 50 g |

To this was added a mixed solution of 247.6 g of ion-exchanged water and 22.35 g of an aqueous 34% by mass potassium hydroxide solution, followed by sufficient stirring to obtain a resin B solution.

MEK with water were distilled off from the resin B solution under reduced pressure condition of a water bath temperature of 35° C. and a pressure of 20 hPa. After the completion of distillation of MEK, ion-exchanged water was added to obtain an aqueous resin B solution having a solid content of 20% by mass.

Dispersion of Pigment

In a 250 ml polyethylene bottle, 400 g of 1.2 mm in diameter zirconia beads were placed and the following components were treated by a paint conditioner manufactured by Toyo Seiki Seisaku-Sho, Ltd. for 4 hours.

| Aqueous resin B solution | 8.64 g |
| Quinacridon-based pigment (manufactured by DAINIPPON INK AND CHEMICALS, INCORPORATED under the trade name of "FASTOGEN SUPER MAGENTA RTS") | 9.25 g |
| Phthalimidomethylated 3,10-dichloroquinacridone (average number of phthalimidemethyl group per molecule: 1.4) | 0.75 g |
| Diethylene glycol | 20.0 g |
| Ion-exchanged water | 20.0 g |

After the completion of the treatment, 10.33 g of ion-exchanged water was added. After further treating for 30 minutes, beads were removed by filtration to obtain a pigment dispersion F-1.

The content of the quinacridone-based pigment of the pigment dispersion F-1 was 13.4% by mass.

To confirm the effect exerted when phthalimidomethylated 3,10-dichloroquinacridone is used as a phthalimidomethylated quinacridone-based compound and a quinacridonesulfonic acid-based compound is used in combination, water-based pigment dispersions shown in the following examples were prepared.

Example 5

Kneading Conditions

A mixture with the following composition was charged in a planetary mixer and then kneaded under the same conditions as in Example 1.

| Resin B | 750 g |
| Quinacridon-based pigment (manufactured by DAINIPPON INK AND CHEMICALS, INCORPORATED under the trade name of "FASTOGEN SUPER MAGENTA RTS") | 4250 g |
| Compound of the formula (III) (average number of phthalimidemethyl group: 1.4) | 250 g |
| Hydrous cake having a solid content of 28.7% of 3,10-dichloroquinacridone sulfonic acid aluminum salt (average number of sulfone group: 1.3) | 1742 g |
| Diethylene glycol | 2000 g |
| Aqueous 34% by mass potassium hydroxide solution | 335 g |

On changing to high speed, a current value of a planetary mixer was 5 A. After kneading was continued, a maximum current value of the planetary mixer was 15 A. After kneading was continued for 3 hours since the maximum current value was attained, the current value of the planetary mixer was 12 A. To the resulting kneaded mixture in a stirring tank, 200 g of ion-exchanged water heated to 60° C. was added and kneading was continued. Uniform mixing was confirmed and, after additional 30 minutes, 200 g of ion-exchanged water heated to 60° C. was added, followed by uniform mixing and further continuous kneading.

Kneading was continued for 4 hours since the observation of the maximum current value to obtain a colored resin composition. To the resulting colored resin composition, 5600 g of ion-exchanged water heated to 60° C. was added by several portions over 2 hours while stirring using a planetary mixer.

The solid content of the colored resin composition after diluting with water was 40.6% by mass. To 12 kg of the colored resin composition taken after diluting with water, 2.49 kg of diethylene glycol and 9.98 kg of ion-exchanged water were added by several portions while stirring using a dispersion stirrer to obtain a water-based pigment dispersion precursor. 18 kg of the water-based pigment dispersion precursor J-1 was dispersed by using a beads mill under the same conditions as in Example 1 to obtain a pigment dispersion J-2. The content of the quinacridone-based pigment of the pigment dispersion J-2 was 14.5% by mass.

Example 6 and Example 7

Using 3,10-dichloroquinacridone sulfonic acid sodium salt in the form of a hydrous cake having a solid content of 28.6% in place of 3,10-dichloroquinacridone sulfonic acid aluminum salt, a water-based pigment dispersion K-2 was prepared under almost the same conditions as in Example 5. Using a resin D in place of the resin B, a water-based pigment dispersion L-2 was prepared under almost the same conditions as in Example 5. Details of the amounts are as shown in Table 2.

Example 8

Kneading Conditions

A mixture with the following composition was charged in a planetary mixer and then kneaded under the same conditions as in Example 1.

| | |
|---|---|
| Resin B | 750 g |
| Quinacridon-based pigment (manufactured by DAINIPPON INK AND CHEMICALS, INCORPORATED under the trade name of "FASTOGEN SUPER MAGENTA RTS") | 4750 g |
| Compound of the formula (III) (average number of phthalimidemethyl group: 1.4) | 250 g |
| Diethylene glycol | 3000 g |
| Aqueous 34% by mass potassium hydroxide solution | 335 g |

On changing to high speed, a current value of a planetary mixer was 5 A. After kneading was continued, a maximum current value of the planetary mixer was 12 A. After kneading was continued for 1.5 hours since the maximum current value was attained, the current value of the planetary mixer was 10 A. To the resulting kneaded mixture in a stirring tank, 200 g of ion-exchanged water heated to 60° C. was gradually added and kneading was continued.

Kneading was continued for 4 hours since the observation of the maximum current value to obtain a colored resin composition. To the resulting colored resin composition, 6800 g of ion-exchanged water heated to 60° C. was added by several portions over 2 hours while stirring using a planetary mixer. The solid content of the colored resin composition after diluting with water was 39.4% by mass. To 12 kg of the colored resin composition taken after diluting with water, 1.61 kg of diethylene glycol and 10.02 kg of ion-exchanged water were added by several portions while stirring using a dispersion stirrer to obtain a water-based pigment dispersion precursor M-1.

18 kg of the water-based pigment dispersion precursor M-1 was subjected to a dispersion treatment by using a beads mill under the same conditions as in Example 1 to obtain a pigment dispersion M-2. The content of the quinacridone-based pigment of the pigment dispersion M-2 was 16.2% by mass.

The water-based pigment dispersion precursor M-2 was subjected to a dispersion treatment under the following conditions to obtain a water-based pigment dispersion M-3.

Dispersion Conditions (2)

In a 250 ml polyethylene bottle, 200 g of 1.2 mm in diameter zirconia beads were placed and the following components were treated by a paint conditioner manufactured by Toyo Seiki Seisaku-Sho, Ltd. for 30 minutes to obtain a water-based pigment dispersion M-3. The content of the quinacridone-based pigment in the resulting water-based pigment dispersion M-3 was 12.8%.

| | |
|---|---|
| Water-based pigment dispersion precursor M-2 | 62.96 g |
| Hydrous slurry having a solid content of 10.0% of 3,10-dichloroquinacridone sulfonic acid sodium salt (average number of sulfone groups: 1.3) | 12.63 g |
| Ion-exchanged water (Example 9) | 4.41 g |

Using a resin D in place of the resin B, a water-based pigment dispersion N-3 was prepared under almost the same conditions as in Example 9. Details of the amount are as shown in Table 2.

TABLE 2

| | | Example 5 | Example 6 | Example 7 | Example 8 | Example 9 |
|---|---|---|---|---|---|---|
| Kneading | Resin | B | B | D | B | D |
| | Amount of resin | 750 | 750 | 750 | 750 | 750 |
| | FASTOGEN SUPERMAGENTA RTS | 4250 | 4250 | 4250 | 4750 | 4630 |
| | Phthalimidomethylated 3,10-dichloroquinacridone | 250 | 250 | 250 | 250 | 380 |
| | Hydrous cake of quinacridonesulfonic acid-based compound | 1742 | 1746 | 1746 | | |
| | Content of hydrous cake | 28.7% | 28.6% | 28.6% | | |
| | Diethylene glycol | 2000 | 2000 | 2000 | 3000 | 3100 |
| | Aqueous 34% by mass potassium hydroxide solution | 335 | 335 | 322 | 335 | 332 |
| | Additional ion-exchanged water for kneading | 400 | 200 | | 200 | 300 |

TABLE 2-continued

|  |  | Example 5 | Example 6 | Example 7 | Example 8 | Example 9 |
|---|---|---|---|---|---|---|
| Dilution | Additional diethylene glycol for kneading |  |  | 200 |  |  |
|  | Additional ion-exchanged water for dilution | 5600 | 6000 | 6000 | 6800 | 6700 |
|  | Solid content of colored kneaded mixture after dilution | 40.6% | 42% | 41.2% | 39.4% | 38.1% |
| Dispersion I | Colored kneaded mixture after dilution | 12000 | 12000 | 12000 | 12000 | 12000 |
|  | Diethylene glycol | 2490 | 2410 | 2360 | 1610 | 1490 |
|  | Ion-exchanged water | 9880 | 10820 | 10330 | 10020 | 9340 |
|  | Water-based pigment dispersion before dispersion treatment | J-1 | K-1 | L-1 | M-1 | N-1 |
|  | Delivery amount of disperser | 200 g/10 sec | 190 g/10 sec | 200 g/10 sec | 200 g/10 sec | 200 g/10 sec |
|  | Content of pigment of water-based pigment dispersion | 14.5% | 14.5% | 14.5% | 16.2% | 15.8% |
|  | Water-based pigment dispersion | J-2 | K-2 | L-2 | M-2 | N-2 |
| Dispersion II | Water-based pigment dispersion |  |  |  | 62.96 | 66.55 |
|  | 10% by mass quinacridonesulfonic acid-based compound |  |  |  | 12.63 | 6.38 |
|  | Ion-exchanged water |  |  |  | 4.41 | 7.06 |
|  | Content of pigment of dispersion after dispersion II |  |  |  | 12.8% | 13.1% |
|  | Water-based pigment dispersion after dispersion II |  |  |  | M-3 | N-3 |

*unit is g unless otherwise so indicated

When high-speed kneading is conducted by using a planetary mixer during kneading in accordance with the above formulation, the temperature of the kneaded mixture was from 90 to 95° C.

(Evaluation of Water-based Pigment Dispersion)

With respect to the water-based pigment dispersions thus obtained in the Examples and Comparative Examples, the particle size was measured at a cell temperature of 25° C. by using a Microtrac UPA particle size analyzer manufactured by Leeds & Northrup Co. In that case, samples for measurement of the particle size were prepared by diluting each of the resulting water-based pigment dispersions with ion-exchanged water so as to adjust the content of the quinacridone-based pigment to 12.5%, and further diluting with ion-exchanged water by 500 times. The results are shown in Table 3 and Table 4.

(Evaluation of Dispersion Stability)

In the same manner as in the case of the dispersion, the water-based pigment dispersions of the Examples and Comparative Examples were adjusted with ion-exchanged water after diluting with ion-exchanged water so as to adjust the content of the quinacridone-based pigment to 12.5% by mass. After controlling the content of the pigment, the dispersion was sealed in a glassware such as screw-thread glass vial and subjected to a heating test in a thermostatic chamber at 60° C. for one week. The dispersion stability was evaluated by observing a change in particle size before and after the heating test. The results are shown in Table 3 and Table 4.

TABLE 3

|  | Dispersion | Resin No. | Composition of resin St/MMA/AA/MAA | Weight-average molecular weight | Volume-average particle size (nm) | Volume-average particle size after heating test (nm) | Change ratio |
|---|---|---|---|---|---|---|---|
| Example 1 | A-2 | A | 77/0/10/13 | 11000 | 108 | 112 | 4% |
| Example 2 | B-2 | B | 77/0/10/13 | 11000 | 106 | 103 | −3% |
| Example 3 | C-2 | C | 77/0/10/13 | 20000 | 116 | 116 | 0% |
| Example 4 | D-2 | D | 77/0/0/23 | 10700 | 125 | 134 | 7% |
| Comparative Example 1 | E-2 | B | 77/0/10/13 | 11000 | 127 | 142 | 12% |
| Comparative Example 2 | F-1 | B | 77/0/10/13 | 11000 | 137 | 145 | 6% |
| Comparative Example 3 | G-2 | E | 77/0/10/13 | 5000 | 107 | 116 | 8% |
| Comparative Example 4 | H-2 | F | 77/0/10/13 | 45000 | 118 | 115 | −3% |
| Comparative Example 5 | I-2 | G | 50/27/10/13 | 12000 | 115 | 117 | 2% |

In Table 3, a change in dispersibility of the water-based pigment dispersions due to the addition of phthalimidomethylated 3,10-dichloroquinacridone and change of the styrene-based resin is shown. The water-based pigment dispersion of Comparative Example 1 wherein phthalimidomethylated 3,10-dichloroquinacridone is not added is inferior in dispersion stability during heating. When using a styrene-based resin obtained by copolymerizing three kinds of monomers such as styrene, acrylic acid, methacrylic acid, the resulting water-based pigment dispersion is excellent in dispersion stability. Furthermore, when using a styrene-based resin having a higher weight-average molecular weight, the resulting water-based pigment dispersion is excellent in stability.

-continued

| | |
|---|---|
| Surfactant (manufactured by Air Products Co., Ltd. under the trade name of "SURFYNOL 440") | 0.5 g |
| Ion-exchanged water | 30.5 g |
| (Ink formulation B) | |
| Diluted water-based pigment solution | 50.0 g |
| 2-pyrrolidinone | 8.0 g |
| Triethylene glycol monobutyl ether | 8.0 g |
| Glycerin | 3.0 g |
| Surfactant (manufactured by Air Products Co., Ltd. under the trade name of "SURFYNOL 465") | 0.5 g |
| Ion-exchanged water | 30.5 g |

TABLE 4

| | Dispersion | Resin No. | Composition of resin St/MMA/AA/MAA | Weight-average molecular weight | Volume-average particle size (nm) | Volume-average particle size after heating test (nm) | Change ratio |
|---|---|---|---|---|---|---|---|
| Example 5 | J-2 | B | 77/0/10/13 | 11000 | 120 | 126 | 5% |
| Example 6 | K-2 | B | 77/0/10/13 | 11000 | 117 | 119 | 2% |
| Example 7 | L-2 | D | 77/0/0/23 | 10700 | 115 | 115 | 0% |
| Example 8 | M-3 | B | 77/0/10/13 | 11000 | 105 | 108 | 3% |
| Example 9 | N-3 | D | 77/0/0/23 | 10700 | 127 | 130 | 2% |

In Table 4, the effect of the use of phthalimidomethylated 3,10-dichloroquinacridone in combination of the quinacridonesulfonic acid-based compound exerted on the dispersibility of the water-based pigment dispersion is shown. As is apparent from the results shown in Table 4, the resulting water-based pigment dispersions show excellent dispersion stability.

To each of the water-based pigment dispersions obtained in the respective Examples and Comparative Examples, ion-exchanged water was added to obtain 50.0 g of a diluted pigment solution containing 10% by mass of the quinacridone-based pigment. Using the resulting diluted water-based pigment solution, an ink composition was prepared so as to adjust the content of the quinacridone-based pigment to 5% in accordance with the following two kinds of formulations in which surfactants having different HLB values and different hydrophobicities are used. In the case of comparing the ink formulation A with the ink formulation B, dispersion stability of the ink composition varies depending on an influence of the surfactant, and the ink composition prepared in accordance with the ink formulation B is more stable.

| (Ink formulation A) | |
|---|---|
| Diluted water-based pigment solution | 50.0 g |
| 2-pyrrolidinone | 8.0 g |
| Triethylene glycol monobutyl ether | 8.0 g |
| Glycerin | 3.0 g |

Reference Example (Comparison of Influence of Ink Formulation A and Ink Formulation B Exerted on Ink Composition)

A difference in dispersion stability between the ink formulation A and the ink formulation B will now be compared.

After diluted water-based pigment solution was prepared from the water-based pigment dispersion B-2 obtained in Example 2, two kinds of ink compositions were prepared in accordance with the ink formulation A and ink formulation B. The resulting ink composition was sealed in a glassware such as screw-thread glass vial and subjected to a heating test in a thermostatic chamber at 70° C. for one week. The stability was evaluated by observing a change in particle size and viscosity before and after the heating test. The results are shown in Table 5 and Table 6. As is apparent from the results, the dispersion of the ink composition prepared in accordance with the ink formulation B is more stable.

The particle size was measured in the same manner as in the case of evaluation of the water-based pigment dispersion, except that the ink composition was diluted with ion-exchanged water by 100 times. The viscosity was measured by an E-type viscometer (manufactured by Tokyo Keiki Co., Ltd., under the trade name of "VISCOMETER TV-20") at 25° C.

Consequently, a conventional ink composition was evaluated by using the ink formulation B, while an ink composition having excellent dispersion stability was evaluated by using the ink formulation A so as to clarify the effect.

TABLE 5

| | Volume-average particle size before heating test (nm) | Volume-average particle size after heating test (nm) | Change ratio | Viscosity before heating test (mPa·s) | Viscosity after heating test (mPa·s) | Change ratio |
|---|---|---|---|---|---|---|
| Ink formulation A | 98 | 111 | 13% | 3.08 | 3.80 | 23% |
| Ink formulation B | 98 | 101 | 2% | 3.26 | 3.32 | 2% |

(Stability Test of Ink Composition)

The resulting ink composition was sealed in a glassware such as screw-thread glass vial and subjected to a heating test in a thermostatic chamber at 70° C. for one week. The stability of the ink composition was evaluated by observing a change in particle size and viscosity before and after the heating test.

The particle size was measured in the same manner as in the case of evaluation of the water-based pigment dispersion, except that the ink composition was diluted with ion-exchanged water by 100 times. The viscosity was measured by an E-type viscometer (manufactured by Tokyo Keiki Co., Ltd., under the trade name of "VISCOMETER TV-20") at 25° C.

The results are shown in Table 6.

(Evaluation of Ink-jet Recordability)

The resulting ink composition before subjecting to the heating test was injected in a black pen of a thermal jet type ink-jet printer manufactured by Hewlett-Packard Co., Ltd. under the trade name of "DeskJet957C", and then the printing test was carried out.

Specifically, solid printing and fine-line printing were carried out using A4-size paper and the ejection state of the ink was observed.

The results are shown in Table 6. Visual observation was carried out according to the following criteria.

With respect to evaluation of ink-jet recordability:
A: uniform solid printing, ejection failure was not observed even at the fine-line portion in all printed samples
B: slightly non-uniform solid printing, ejection failure was not observed even at the fine-line portion
C: non-uniform solid printing, ejection failure was not observed at the fine-line portion but printing position deviation was observed
D: irregular printing due to ejection failure was observed at the solid printing portion, and printing omission due to ejection failure was observed at the fine-line portion
E: ejection failure often occurs In the same manner, the resulting ink composition before subjecting to the heating test was injected in a black pen of a piezoelectric jet type printer manufactured by Epson Corp. under the trade name of "EM-900C", and then the printing test was carried out.

Specifically, solid printing and fine-line printing were carried out using A4-size paper and the ejection state of the ink was observed. In the case of both ink compositions of the Examples and Comparative Examples, no problems were observed.

TABLE 6

| | | Resin | | | Pigment derivative | | | |
|---|---|---|---|---|---|---|---|---|
| | Dispersion | Kind | Composition | Weight-average molecular weight | Formula I | Sulfonic acid-based compound | Kneading step | Dispersing step |
| Example 5 | J-2 | B | 77/10/13 | 11000 | ○ | ○ | ○ | one stage |
| Example 6 | K-2 | B | 77/10/13 | 11000 | ○ | ○ | ○ | one stage |
| Example 7 | L-2 | D | 77/23 | 10700 | ○ | ○ | ○ | one stage |
| Example 8 | M-3 | B | 77/10/13 | 11000 | ○ | ○ | ○ | two stages |
| Example 9 | N-3 | D | 77/23 | 10700 | ○ | ○ | ○ | two stages |
| Reference Example | B-2 | B | 77/10/13 | 11000 | ○ | | ○ | one stage |
| Example 1 | A-2 | A | 77/10/13 | 11000 | ○ | | ○ | one stage |
| Example 2 | B-2 | B | 77/10/13 | 11000 | ○ | | ○ | one stage |
| Example 3 | C-2 | C | 77/10/13 | 20000 | ○ | | ○ | one stage |
| Example 4 | D-2 | D | 77/23 | 10700 | ○ | | ○ | one stage |
| Comparative Example 1 | E-2 | B | 77/10/13 | 11000 | | | ○ | one stage |
| Comparative Example 2 | F-2 | B | 77/10/13 | 11000 | ○ | | | one stage |
| Comparative Example 3 | G-2 | E | 77/10/13 | 5000 | ○ | | ○ | one stage |
| Comparative Example 4 | H-2 | F | 77/10/13 | 45000 | ○ | | ○ | one stage |
| Comparative Example 5 | I-2 | G | 50/27/10/13 | 12000 | ○ | | ○ | one stage |

TABLE 6-continued

| | Ink formulation | Particle size (nm) | | | Viscosity (mPa·sec) | | | Ink-jet recordability |
|---|---|---|---|---|---|---|---|---|
| | | Before heating test | After heating test | Change ratio | Before heating test | After heating test | Change ratio | |
| Example 5 | A | 107 | 110 | 3 | 3.14 | 3.21 | 2 | B |
| Example 6 | A | 110 | 108 | −2 | 3.03 | 3.03 | 0 | A |
| Example 7 | A | 120 | 124 | 3 | 3.01 | 2.78 | 5 | B |
| Example 8 | A | 110 | 106 | −4 | 4.19 | 3.03 | −28 | A |
| Example 9 | A | 125 | 135 | 8 | 3.6 | 3.85 | 7 | B |
| Reference Example | A | 98 | 111 | 13 | 3.08 | 3.8 | 23 | |
| Example 1 | B | 102 | 108 | 6 | 3.15 | 3.24 | 3 | A |
| Example 2 | B | 99 | 101 | 2 | 3.26 | 3.32 | 2 | A |
| Example 3 | B | 107 | 108 | 1 | 3.22 | 3.21 | 0 | A |
| Example 4 | B | 121 | 128 | 6 | 3.18 | 3.2 | 1 | B |
| Comparative Example 1 | B | 125 | 243 | 94 | 2.97 | 4.85 | 63 | D |
| Comparative Example 2 | B | 129 | 215 | 67 | 3.42 | 7.77 | 127 | C |
| Comparative Example 3 | B | 111 | 122 | 10 | 2.81 | 3.24 | 15 | B |
| Comparative Example 4 | B | 118 | 118 | 0 | 4.12 | 4.02 | −2 | E |
| Comparative Example 5 | B | 115 | 118 | 3 | 3.01 | 3.05 | 1 | C |

As is apparent from the results shown in Table 6, when water-based ink compositions are prepared from the water-based pigment dispersions of Example 5 to Example 9 wherein phthalimidomethylated 3,10-dichloroquinacridone and a quinacridonesulfonic acid-based compound are used in combination, the resulting ink compositions are excellent in dispersion stability during heating and ink-jet recordability.

The ink compositions of Example 1 to Example 4, wherein only phthalimidomethylated 3,10-dichloroquinacridone is used, are excellent in characteristics. However, the ink compositions of Example 5 to Example 9 are more excellent in dispersion stability during heating taking accounts of the ink formulation. The ink composition of Comparative Example 1, wherein no phthalimidomethylated quinacridone-based compound is used, showed large increase in particle size and viscosity before and after the heating and is inferior in stability during heating. The ink composition of Comparative Example 2, wherein the phthalimidomethylated quinacridone-based compound is used but the kneading step is not included, also showed large increase in particle size and viscosity before and after the heating and is inferior in stability during heating. The ink composition of Comparative Example 3 is excellent in ink-jet recordability, but is inferior in stability during heating as compared with those of Example 1 to Example 4 because of the influence of the weight-average molecular weight of the resin. The ink composition of Comparative Example 4, wherein a resin having a large weight-average molecular weight is used, is excellent in dispersion stability, but is inferior in recordability due to a thermal jet type ink-jet printer. The ink composition of Comparative Example 5, wherein a four-component resin containing 50% by mass or more of a styrene-based monomer unit, is not inferior in dispersion stability, but is inferior in excellent recording characteristics as compared with those of Example 1 to 4.

INDUSTRICAL APPLICABILITY

According to the present invention, it is made possible to efficiently obtain a water-based ink for ink-jet recording, which contains pigment particles having a very small particle size and is excellent in dispersion stability, by further diluting the resulting water-based pigment dispersion with an aqueous medium and optionally adding various additives, and thus the present invention is very effective from industrial points of view.

The invention claimed is:

1. A method of producing a water-based pigment dispersion for ink-jet ink, comprising:

a kneading process for kneading a mixture containing a styrene-based resin, a quinacridone-based pigment, a phthalimidomethylated quinacridone-based compound, an alkali metal hydroxide and a humectant to produce a solid and colored kneaded mixture; and a dispersing process for dispersing the solid and colored kneaded mixture in an aqueous medium, wherein the styrene-based resin has 60% by mass or more of a styrene-based monomer unit based on all monomer components, a monomer unit containing an unsaturated aliphatic carboxylic acid having a radical polymerizable double bond, an acid value of 50 to 300 and a weight-average molecular weight of 7500 to 40000; and the solid content of the kneaded mixture containing the styrene-based resin, the quinacridone-based pigment and the phthalimidomethylated quinacridone-based compound during kneading is from 50 to 80% by mass.

2. The method of producing a water-based pigment dispersion for ink-jet ink according to claim 1, wherein a quinacridonesulfonic acid-based compound is added in the kneading or dispersing process.

3. The method of producing a water-based pigment dispersion for ink-jet ink according to claim 1, wherein the styrene-based resin has 60% by mass or more of a styrene-based monomer unit based on all monomer components, an acrylic acid monomer unit and a methacrylic acid monomer unit.

4. The method of producing a water-based pigment dispersion for ink-jet ink according to claim 1 or 2, wherein, in the kneading process, the content of the styrene-based resin is from 10 to 50% by mass based on 100 parts by mass of the total amount of the quinacridone-based pigment, the phthalimidomethylated quinacridone-based compound and the quinacridonesulfonic acid-based compound; and the content of the humectant is from 40 to 80 parts by mass based on 100 parts by mass of the total amount of the quinacridone-based pigment, the phthalimidomethylated quinacridone-based compound and the quinacridonesulfonic acid-based compound.

5. The method of producing a water-based pigment dispersion for ink-jet ink according to claim 1 or 2, wherein the styrene-based resin has a glass transition point of 90° C. or higher.

6. The method of producing a water-based pigment dispersion for ink-jet ink according to claim 1 or 2, wherein the amount of the alkali metal hydroxide is 0.8 to 1.2 times the amount required to neutralize all carboxyl groups of the styrene-based resin.

7. The method of producing a water-based pigment dispersion for ink-jet ink according to claim 1, wherein the phthalimidomethylated quinacridone-based compound is a compound represented by the formula (I):

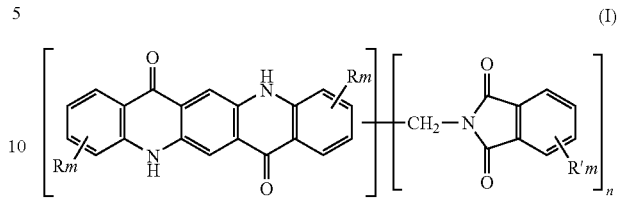

wherein R and R' each independently represents hydrogen, halogen, an alkyl group having 1 to 5 carbon atoms or an alkoxy group having 1 to 5 carbon atoms, m represents 0, 1 or 2, and n represents 1 to 4.

8. The method of producing a water-based pigment dispersion for ink-jet ink according to claim 1, wherein the quinacridone-based pigment is C.I. Pigment Red 122.

9. An ink composition for ink-jet recording comprising, as a main component, the water-based pigment dispersion for ink-jet ink produced by the method of any one of claims 1 to 3, 7 and 8.

10. The ink composition for ink-jet recording according to claim 9, which is used for a thermal jet type printer.

11. The method of producing a water-based pigment dispersion for ink-jet ink according to claim 7, wherein the compound represented by the formula (I) is a compound represented by the following formula (III):

$$\left[\begin{array}{c}\text{(III)}\end{array}\right]$$

wherein m and n each independently represents 0, 1 or 2. provided that m and n are not simultaneously 0.

12. The method of producing a water-based pigment dispersion for ink-jet ink according to claim 1, wherein the phthalimidomethylated quinacridone-based compound is a compound represented by the formula (I):

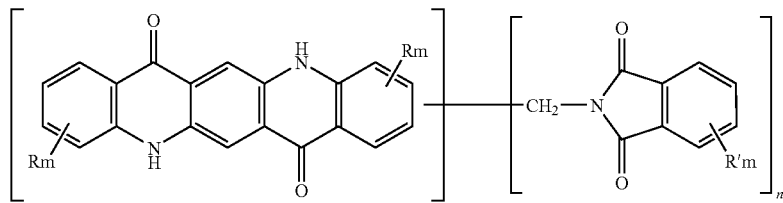
wherein R and R' each independently represents hydrogen, fluorine, chlorine, bromine, iodine, or an alkyl group having 1 to 5 carbon atoms, m represents 0, 1 or 2. and n represents 1 to 4.
* * * * *